United States Patent [19]
Bucalo

[11] 3,901,224
[45] Aug. 26, 1975

[54] THERMAL CONTROL OF BODY FUNCTIONS

[75] Inventor: Louis Bucalo, Holbrook, N.Y.

[73] Assignee: Investors in Ventures, Inc., New York, N.Y.

[22] Filed: Aug. 27, 1973

[21] Appl. No.: 391,886

[52] U.S. Cl. ............ 128/82.1; 128/130; 128/214 A; 128/401
[51] Int. Cl. ................................. A61f 13/00
[58] Field of Search ............... 128/399–402, 128/82.1, 303.1, 303.12, 1, 130, 138 R, 214 A

[56] References Cited
UNITED STATES PATENTS

| | | | |
|---|---|---|---|
| 1,620,929 | 3/1927 | Wallerich | 128/401 UX |
| 2,069,284 | 2/1937 | Solomon | 128/401 |
| 3,142,158 | 7/1964 | Podolsky | 128/214 A |
| 3,170,465 | 2/1965 | Henney et al. | 128/401 |
| 3,228,400 | 1/1966 | Armao | 128/303.1 |
| 3,315,681 | 4/1967 | Poppendiek | 128/214 A |

OTHER PUBLICATIONS
Burton et al., IEE Transactions on Bio-Medical Engineering, Vol. BME–18, No. 2, Mar. 1971, pp. 104–109.

Primary Examiner—Lawrence W. Trapp
Attorney, Agent, or Firm—Steinberg & Blake

[57] ABSTRACT

A method and device for thermally controlling body functions. A thermally conductive element is situated in the interior of the body at a location where a change in temperature will regulate a body function, and the temperature of this element is controlled in order to regulate the body function. Thus, the device may include a thermally conductive element situated either in the uterus of a female or a vas deferens of a male for placing ova or sperm in a condition where they are incapable of producing a fertilized ovum.

18 Claims, 4 Drawing Figures

PATENTED AUG 26 1975    3,901,224

THERMAL CONTROL OF BODY FUNCTIONS

BACKGROUND OF THE INVENTION

The present invention relates to thermal control of body functions.

It is known that certain functions of living beings may be regulated by regulation of temperature. For example, it is known that sperm of a male being are incapable of fertilizing an ovum if the sperm is exposed to a given elevated temperature. The same is true of ova which are incapable of becoming fertilized if exposed to a given temperature. In addition, it is known that certain body functions can be altered with temperature regulation. For example, the condition of blood and the manner in which the latter flows can be regulated for various purposes by temperature regulation, and the condition of various nerves, muscles, and other body components can be determined in accordance with temperature regulation.

Although the latter phenomena are known, considerable difficulty has been encountered in achieving the required controls in the body of a living being. Thus, while as a matter of theory it may be known that various body functions can be regulated by temperature regulation, up to the present time it has not been possible to achieve the required temperature regulation in an effective, practical manner.

SUMMARY OF THE INVENTION

It is accordingly a primary object of the present invention to provide a method and device which wll make it possible to achieve effectively and practically control of body functions through temperature regulation.

In particular, it is an object of the present invention to provide a convenient manner of situating in the interior of a body an implant which is capable of regulating temperature in response to controls which may be achieved electrically or magnetically, for example.

Thus, it is an object of the present invention to provide a method and device which can be readily implanted to achieve the required temperature regulation.

Furthermore, it is an object of the present invention to provide a method and device according to which the entire unit for thermal regulation is situated in the interior of the body and is capable of remaining therein for a long period of time.

Also it is an object of the present invention to provide a method and device according to which although a thermally conductive element is situated in the interior of the body the control of the latter takes place from the exterior of the body.

According to the invention a thermally conductive element is situated in the interior of a body at a part thereof where a function of the body will be controlled by temperature regulation, and the temperature of the thermally conductive element is controlled in order to bring about the desired regulation. The thermally conductive element is preferably in the form of an implant which may be surgically situated in the interior of the body at a desired location, and a means is connected with the implant to control the temperature thereof. This latter means may be situated at the exterior of the body to control the implant from the exterior of the body or this means may be situated together with the implant in the interior of the body.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
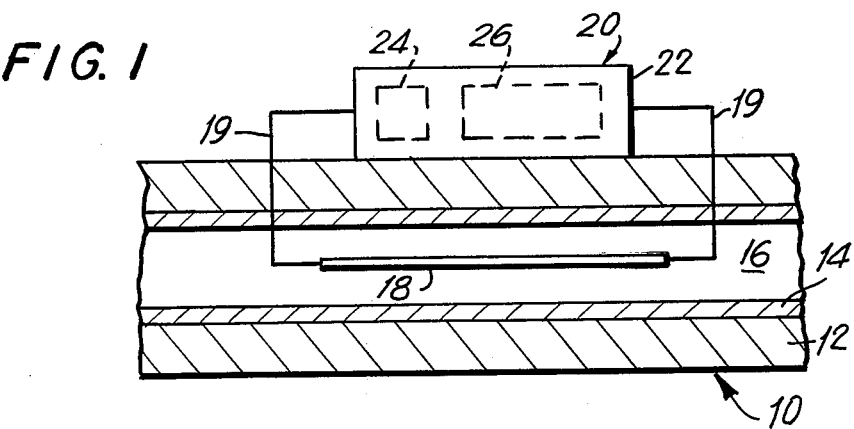
FIG. 1 is a fragmentary schematic sectional elevation showing the method and device of the invention as applied to a vas deferens.

Various methods and devices according to the invention are illustrated in the drawings. However, it is to be understood that the methods and devices illustrated in the drawings and described in detail below are only by way of example since the method and device of the invention has many other applications.

Referring to FIG. 1, there is schematically illustrated therein a vas deferens 10 of a human male. This vas deferens includes, as is well known, the outer tissue 12 and the inner tubular structure 14 defining the hollow interior lumen 16 of the illustrated vas deferens. In accordance with the invention there is implanted within the lumen 16 a thermally conductive element 18 which in the illustrated example is in the form of a simple electrically conductive resistance wire. This wire is made of any electrically conductive material which is rendered compatible with the body. In addition the properties of the wire 18 are such that its temperature becomes elevated when electricity is conducted therethrough. For example the thermally conductive element 18 may be in the form of a nichrome wire which is a well known resistance wire whose temperature becomes elevated when electricity is conducted therethrough. In order to be compatible with the body wire 18 may be coated with gold.

The thermally conductive element 18 is implanted in the interior of the vas deferens 10 through any surgical procedure. For example a surgeon will provide a longitudinal incision sufficiently long to insert the wire 18 so that it will assume the position indicated in FIG. 1, and then the incision is closed with suitable sutures so that the wire 18 remains in the position illustrated. It will be noted that as illustrated in FIG. 1 the wire 18 provides practically no obstruction to the flow of fluid in the interior of the vas deferens. It is carried by and connected between low resistance conductors 19 which extend through the vas wall, as illustrated, and which also may be coated with gold.

A means 20 is connected with the thermally conductive element 18 through low resistance conductors 19 for regulating the temperature in the interior of the vas. In the illustrated example this means 20 takes the form of a unit housed within a suitable enclosure 22 which is surgically fastened in the body at the exterior of the vas so that the means 20 will remain in the position illustrated. It will be noted that the wire 18 is electrically connected with the means 20 through the conductors 19. Within the enclosure 22 are located elements such as the schematically illustrated battery 24 and the timing mechanism 26. Such units are well known in the case of pacemakers, for example. Thus, through the means 20 it is possible to conduct electricity through the thermally conductive element 18 according to a predetermined program, or, if preferred, it is simply possible to continuously conduct electricity through the element 18 since it consumes only a small amount of electricity and since the temperature elevation need only be of a relatively small order.

For example it is known that if the interior of the vas deferens is maintained by the thermally conductive element 18 at a temperature on the order of 5°–15° C above normal body temperature then the sperm will be killed and thus reliably placed in a condition where conception is prevented. Thus through the simple expedient illustrated in FIG. 1 in accordance with the present invention it is possible to provide in the lumen 16 a temperature high enough to render a sufficiently large number of sperm incapable of fertilizing an ovum. In this way without interfering with the flow of the seminal fluid it is possible to avoid conception in a highly reliable manner. At the same time, it is possible after relatively long intervals to replace the battery 24 as required, and in addition it is at any time possible to remove the battery 24 so that conception can be achieved without at any time interrupting the flow of fluid through the vas deferens.

Of course it is to be understood that the arrangement shown in FIG. 1 may be applied to both of the vas deferentia of a male, although in some cases it is desired to provide an arrangement as shown in FIG. 1 at only one vas deferens. For example, it may be suspected that faulty sperm are derived through one of the vas deferentia so that through acting only on a single vas deferens it is possible to prevent conception by certain types of sperm. Furthermore, it may be found that sperm from one of the vas deferentia results in the birth of male babies while sperm through the other of the vas deferentia results in the birth of female babies, and by selectively applying the device of the invention and practicing the method of the invention at only one of the vas deferentia it may be possible to control the sex of offspring.

Figure 2:
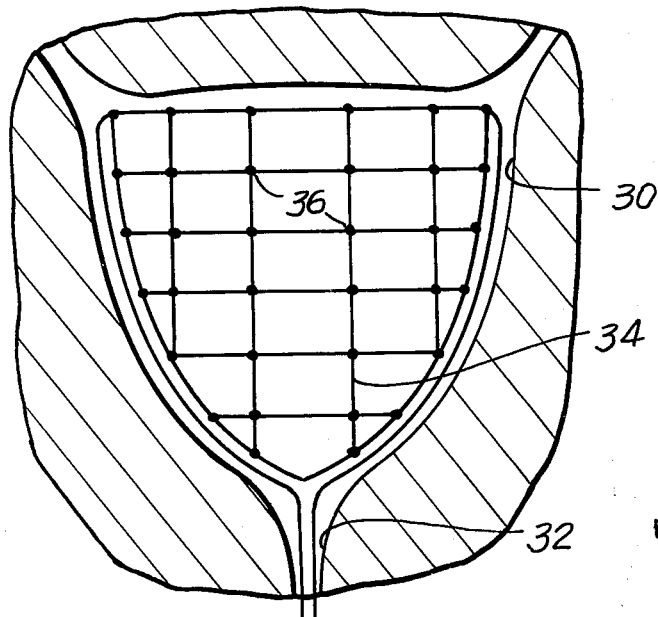
FIG. 2 is a schematic sectional elevation showing a method and device of the invention as applied to the uterus.

Referring to FIG. 2, there is schematically illustrated therein the hollow interior 30 of the uterus of a female. Through the mouth 32 of the uterus it is possible to introduce the IUD 34 which in the illustrated example takes the form of a flat network of electrically conductive wires which have a relatively low resistance but at their intersections 36 provide elevated temperatures as a result of contact resistance. The network of wires may be gold-coated and is electrically connected to a unit 38 which may be the same as the unit 20 housing in its interior devices such as a battery 40 and timer 42 so that in this way it is possible to regulate the flow of electricity through the electrically conductive network 34. Unit 38 may be located in the vagina. In this case also it is possible if desired to continuously conduct electricity through the network so as to maintain the interior of the uterus constantly at an elevated temperature. Thus, if the temperature in the interior of the uterus is maintained at 5°–15° C above normal body temperature, the ova periodically received in the interior of the uterus will be incapable of assuming a condition where they can be fertilized.

In connection with FIG. 2 it is emphasized that it is not essential to situate the device of the invention in the interior of the uterus. For example the device of the invention may be located at the cervix where it is equally effective to achieve the desired results.

Figure 3:
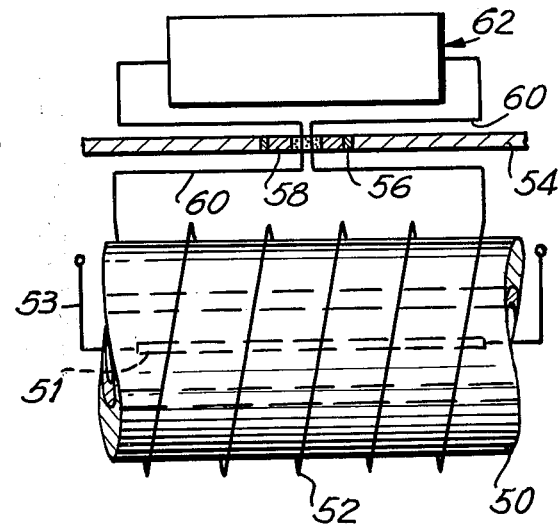
FIG. 3 is a schematic fragmentary elevation showing a method and device of the invention as applied to a vas deferens with the regulating means being situated at the exterior of the body.

Referring to FIG. 3, there is schematically illustrated therein part of a vas deferens 50 around which an electrically conductive high frequency heating coil 52 is situated in the manner schematically illustrated. This situation of the coil 52 around the vas deferens is brought about by surgical procedures which are very simple to carry out. The outer wall 54 of the body, at the region of the vas deferens 50, is formed with an opening in which a sleeve 56 is fixed, this sleeve fluid-tightly carrying a plug 58 which at its interface with the sleeve 56 has a bacteriological barrier preventing bacteria from travelling between the exterior and interior of the body. The plug 58 is formed with an opening through which conductors 60 extend, this opening being tightly closed by a plastic filler surrounding the conductors 60 with these conductors being connected to the ends of the coil 52, and at the exterior of the body the conductors 60 are connected to a unit 62 which houses a source of high frequency current. However, in this case the unit 62 is located at the exterior of the body where it is always accessible. The unit 62 includes such devices as the battery 66 and the high frequency current generator 66, so that it is capable of energizing the coil 52. The temperature of the coil 52 is not raised by the high frequency current but, the temperature in the space surrounded by the coil is raised, and this temperature elevation is sufficient to create in the interior of the vas 50 a temperature sufficiently high to render components such as sperm incapable of fertilizing an ovum. Although the interior vas chamber surrounded by coil 52 can remain empty, the efficiency of the device is increased by locating in the vas lumen a small diameter rod 51 of good thermal conductivity supported by wires 53 connected to the vas wall by surgical procedures when implant 51 is introduced. Of course it is to be understood that the arrangement shown in FIG. 3 for one of the vas deferentia may be applied to both of the vas deferentia or selectively to only one vas deferens as pointed out above in connection with FIG. 1.

Figure 4:
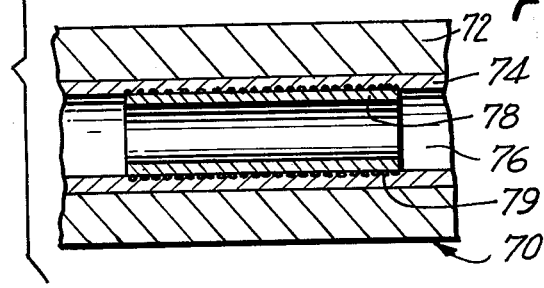
FIG. 4 is a schematic sectional elevation of a further embodiment of a method and device of the invention according to which the controls are derived from the exterior of the body while the thermally conductive element is situated in a vas deferens.

Referring in FIG. 4, there is schematically illustrated therein, in a sectional elevation, part of a vas deferens 70 which also has the outer layer of tissue 72 and the inner vas proper 74 which defines the hollow interior lumen 76. In the lumen 76 there is situated an elongated tubular thermally conductive element 78 which may be surrounded by tissue-ingrowth means 79. This element 78 may be situated in the interior of the vas through a simple surgical procedure. Thus as pointed out above in connection with FIG. 1 it is a simple matter for a surgeon to provide a longitudinal incision through which the tube 78 is inserted after which the incision is closed by suitable sutures so that it will heal and thus retain the tubular element 78 in the interior of the vas in a manner illustrated in FIG. 4. It is to be noted that the wall thickness of the tubular element 78 is relatively small so that there is practically no obstruction to flow of fluid at any time through the lumen 76. FIG. 4 illustrates also the outer wall 80 of the body.

In accordance with the embodiment of the invention shown in FIG. 4, the tubular element 78 is made of a material whose temperature increases when this material is traversed by lines of magnetic flux. Thus it is known that various materials have an elevated temperature when located in a field of moving lines of flux. Thus, the tubular element 78 may be made of a gold-coated ferrous alloy, for example, or any other known material whose temperature can be controlled by magnetic induction.

According to this embodiment of the invention it is only necessary to situate at the exterior of the body in the region of the element 78 a unit 82 which can be connected into any source of electricity so as to generate a moving magnetic field. By locating the unit 82 at the location illustrated in FIG. 4 the moving magnetic field will travel across the element 78 so as at elevate the temperature thereof by magnetic induction. This unit 82 may have its own battery and can be attached to the exterior of the body in a very convenient manner. Thus as long as the unit 82 operates the element 78 responds by magnetic induction to have an elevated temperature sufficiently high to prevent the sperm-carrying fluid in the lumen 76 from carrying a number of viable sperm sufficiently large to provide conception.

Of course with the embodiment of FIG. 4 it is also possible to provide the illustrated method and device at both of the vas deferentia or at only one vas deferens. Furthermore it is clear that the control of temperature by magnetic induction may be easily applied to the interior uterus, and in fact, as was pointed out above, methods and devices of the invention may be applied to any part of the interior of the body where a body function will be controlled by temperature regulation.

Any desired combination of the features of the invention may be used. Internal units 20 and 38 can be situated outside the body and external units 62 and 82 can be located inside the body. Magnetic induction and high frequency or resistance heating can be used in the uterus or cervix. All interior components may be gold-plated. Also a resistance wire such as wire 18 preferably takes the form of a braid of several fine wires having a much larger surface area than a single wire.

As is apparent from the above description, the methods and devices of the invention are particularly suitable in those cases where it is not desired to obstruct the flow of a body fluid while at the same time it is highly desirable to control the condition of components which are carried by the fluid. Thus, in the particular examples illustrated components such as ova and sperm can have their condition regulated without in any way interfering with the flow of body fluids.

What is claimed is:

1. In a method for controlling a body function, the steps of introducing a thermally conductive element in its entirety into the interior of a cavity of the body of a living being where a body fluid flows at least periodically, to which access can be had only by a medical procedure, and where a function will change with a temperature change, without providing any substantial obstruction to the flow of body fluid in the cavity and while providing for the cavity a size and shape which is substantially the same after said thermally conductive element is introduced into said cavity as before said element was introduced into said cavity, and controlling the temperature of the thermally conductive element so as to control the function.

2. In a method as recited in claim 1 and wherein said thermally conductive element is electrically conductive and has one temperature when conducting electricity and another temperature when not conducting electricity, and conducting electricity through said element according to a predetermined program at given time intervals and frequencies for controlling the body function.

3. In a method as recited in claim 1 and wherein said thermally conductive element has one temperature when traversed by lines of magnetic flux and another temperature when not traversed by lines of magnetic flux, and moving a magnetic field with respect to said element according to a predetermined program for controlling the body function.

4. In a method as recited in claim 1 and wherein said thermally conductive element is electrically conductive and provides when conducting electricity a temperature higher than when not conducting electricity, and conducting electricity through said element for raising the temperature in the interior of the body to control the body function.

5. In a method as recited in claim 1 and wherein said thermally conductive element has an elevated temperature when traversed by lines of magnetic flux, and creating at said thermally conductive element a magnetic field which by magnetic induction elevates the temperature of said thermally conductive element for controlling the body function.

6. In a method for controlling a body function the steps of introducing a thermally conductive element into the interior of a cavity of the body of a living being where a body fluid flows at least periodically, to which access can be had only by a medical procedure, and where a function will change with a temperature change, without providing any substantial obstruction to the flow of body fluid in the cavity, and controlling the temperature of the thermally conductive element so as to control the function, said thermally conductive element being situated in the interior of the body at a part thereof where there are components such as sperm or ova essential for conception, and controlling the temperature of said thermally conductive element to place said components in a condition preventing conception.

7. In a method as recited in claim 6 and wherein said thermally conductive element is situated in the uterus of a female.

8. In a method for controlling a body function, the steps of situating a thermally conductive element in the interior of the body of a living being at a location where a function will change with a temperature change, and controlling the temperature of the thermally conductive element so as to control the function, with said thermally conductive element situated in the interior of the body at a part thereof where there are components such as sperm or ova essential for conception, and controlling the temperature of said thermally conductive element to place said components in a condition preventing conception, said thermally conductive element being at at least one vas deferens of a male.

9. A device for thermally controlling a body function, comprising a temperature-regulating implant to be situated in its entirety in the interior of a body cavity to which access can only be had by a medical procedure and in which a body fluid flows at least periodically, said implant having a size and configuration which will not obstruct the flow of fluid through the body cavity to any substantial extent and which is capable of being received in said body cavity without substantially changing the size and shape thereof, and means cooperating with said implant for operating the latter to control temperature.

10. The combination of claim 9 and wherein said implant is electrically conductive and said means includes a source of electricity connected electrically with said implant.

11. The combination of claim 9 and wherein said implant is made of a material whose temperature changes in response to magnetic induction, and said means providing a magnetic field in which the implant is located.

12. The combination of claim 9 and wherein said implant is in the form of an electrically conductive wire and said means is electrically connected with said wire and includes a source of electricity for conducting electricity through said wire.

13. The combination of claim 9 and wherein said means is also in the form of an implant to be situated in the body together with said temperature-regulating implant.

14. The combination of claim 12 and wherein said means is adapted to be situated at the exterior of a body, and electrical conductors connecting said means to said implant, and means carried by the body for supporting the conductors in a position extending between the interior and exterior of the body.

15. A device for thermally controlling a body function, comprising a temperature-regulating implant to be situated in the interior of a body, and means cooperating with said implant for operating the latter to control temperature, said implant being an IUD composed of a network of electrical wires which intersect each other and have a relatively high resistance at their intersections for providing elevated temperatures at said intersections when electricity is applied to said wires, and said means being electrically connected with said wires for supplying electricity thereto.

16. A device for thermally controlling a body function, comprising a temperature-regulating implant to be situated in the interior of a body, and means cooperating with said implant for operating the latter to control temperature, said temperature-regulating implant being in the form of a high-frequency heating coil placed around at least one vas deferens, said means including a source of electricity electrically connected with said coil for supplying high-frequency current thereto.

17. A device for thermally controlling a body function, comprising a temperature-regulating implant to be situated in the interior of a body, and means cooperating with said implant for operating the latter to control temperature, said implant being in the form of a tube adapted to be implanted in at least one vas deferens of a male.

18. The combination of claim 17 and wherein said tube responds to magnetic induction for creating in the interior of the vas deferens a temperature sufficiently high to render sperm incapable of fertilizing an ovum.

* * * * *